United States Patent [19]

Ellen

[11] Patent Number: 4,467,702

[45] Date of Patent: Aug. 28, 1984

[54] HYDRAULIC JACKS

[76] Inventor: Peter E. Ellen, Hong Kong & Macau Bldg., 156-7 Connaught Rd., C., Hong Kong, Hong Kong

[21] Appl. No.: 333,389

[22] Filed: Dec. 22, 1981

[30] Foreign Application Priority Data

Dec. 24, 1980 [AU] Australia .............................. PE7065

[51] Int. Cl.³ ............................................. F01B 31/06
[52] U.S. Cl. ....................................... 92/108; 92/109;
 92/169; 92/222; 29/156.4 WL; 29/252; 254/93 R
[58] Field of Search ................. 92/107, 108, 109, 13.6,
 92/169, 222; 29/156.4 R, 156.4 WL, 252; 254/93 R

[56] References Cited

U.S. PATENT DOCUMENTS

| 2,264,379 | 12/1941 | Hubbard | 92/108 |
| 3,150,570 | 9/1964 | Johnson et al. | 92/169 |
| 4,249,458 | 2/1981 | Massing | 92/13.6 |

Primary Examiner—Robert E. Garrett
Assistant Examiner—Scott L. Moritz
Attorney, Agent, or Firm—Michael J. Striker

[57] ABSTRACT

A hydraulic jack having a piston and a cylinder in which the piston has at its head a cavity the dimensions of the cavity and the constructional materials of the cylinder and the piston being selected so that hydraulic pressure applied within the cylinder acts to deform the cylinder wall and the parts of the piston defining the cavity in such a manner that, over the normal rate of operating pressures of the jack the clearance between the piston and the cylinder remains within the capacity of the sealing means arranged between the piston and the cylinder to provide an effective seal.

6 Claims, 2 Drawing Figures

HYDRAULIC JACKS

The present invention relates to hydraulic jacks such as are used for a variety of purposes in which a large force has to be exerted. An example of such a purpose is in the stressing of cables used in reinforcing concrete in connection with which the forces to be applied may reach many hundreds of tons. The invention while of particular value in that field is of general applicability to hydraulic jacks particularly to those of a substantial capacity.

The design of hydraulic jacks is usually governed by the deformation, due to the hydraulic pressure, between the outer cylinder and the piston. To seal the hydraulic fluid effectively specific design clearances are required between the inner piston and the outer wall of the hydraulic jack. To maintain these specific clearances the strains in the materials used in the design of the jack are limited to specific values.

As the available working hydraulic pressures have increased so have the radial forces in the jack cylinders and, due to the necessity to control the material strains, the thickness of the materials must increase with a corresponding increase in total weight.

To enable the weight to be reduced the conventional methods are to use lighter basic materials such as alloys of aluminium and/or magnesium. However, these materials are generally very expensive and also usually have similar limitations of strain control for, as the basic weight is reduced, the modulus of elasticity usually also reduces, with a corresponding increase in strain, thus offsetting the benefit gained from the weight reduction.

An alternative principle adopted in the present invention is to use high tensile steels in thin sections to reduce the weight, but in doing so the differential strains between the sliding parts such as the piston and the cylindrical wall and/or the piston and the end caps of the cylinder must be controlled.

Weight reductions in these circumstances are possible as higher tensile materials can be used and controlled, giving reductions in weight of up to 50-60%.

Internal jack friction may also be reduced as the general jack clearances may be increased to give lesser sliding friction and the conventional "seals" or "U" cups on the piston may be formed as "blocks" which expand according to the tolerance between the piston and the outer or inner confining cylinder walls, these seals can be used as "rubbing" or lubricating surfaces, thereby reducing internal friction.

The principle underlying the design of hyraulic jacks according to the present invention is to make use of the fluid pressure within the jack to deform both the wall of the piston and the wall of the cylinder to varying extents depending on the geometry of these parts and the physical properties of the materials from which they are made to provide a controlled clearance between the piston wall and the cylinder wall under all conditions in which the hydraulic jack is required to operate. The same design principles may be applied to the design of end caps for hydraulic cylinders.

The invention thus consists in a hydraulic jack comprising a cylinder and a piston movable therein, the piston having in its head a cavity, said cavity being bounded by the inner surface of a peripheral wall of the piston, the outer surface of which is in close proximity to the inner surface of the cylinder, sealing means being provided between the piston and cylinder to seal the clearance between the same, the dimensions of and the constructional materials of the cylinder and of the piston wall being selected so that hydraulic pressure applied within the cylinder acts to deform the cylinder wall and the piston wall in such a manner that, over the normal range of operating pressures of the jack the clearance between the piston and the cylinder remains within the capacity of the sealing means to provide an effective seal between them. In certain forms of the invention the head of the piston is annular in form and the well therein also annular.

In order that the nature of the invention may be better understood a preferred embodiment thereof is hereinafter described, by way of example, with reference to the accompanying drawings in which.

Figure 1:
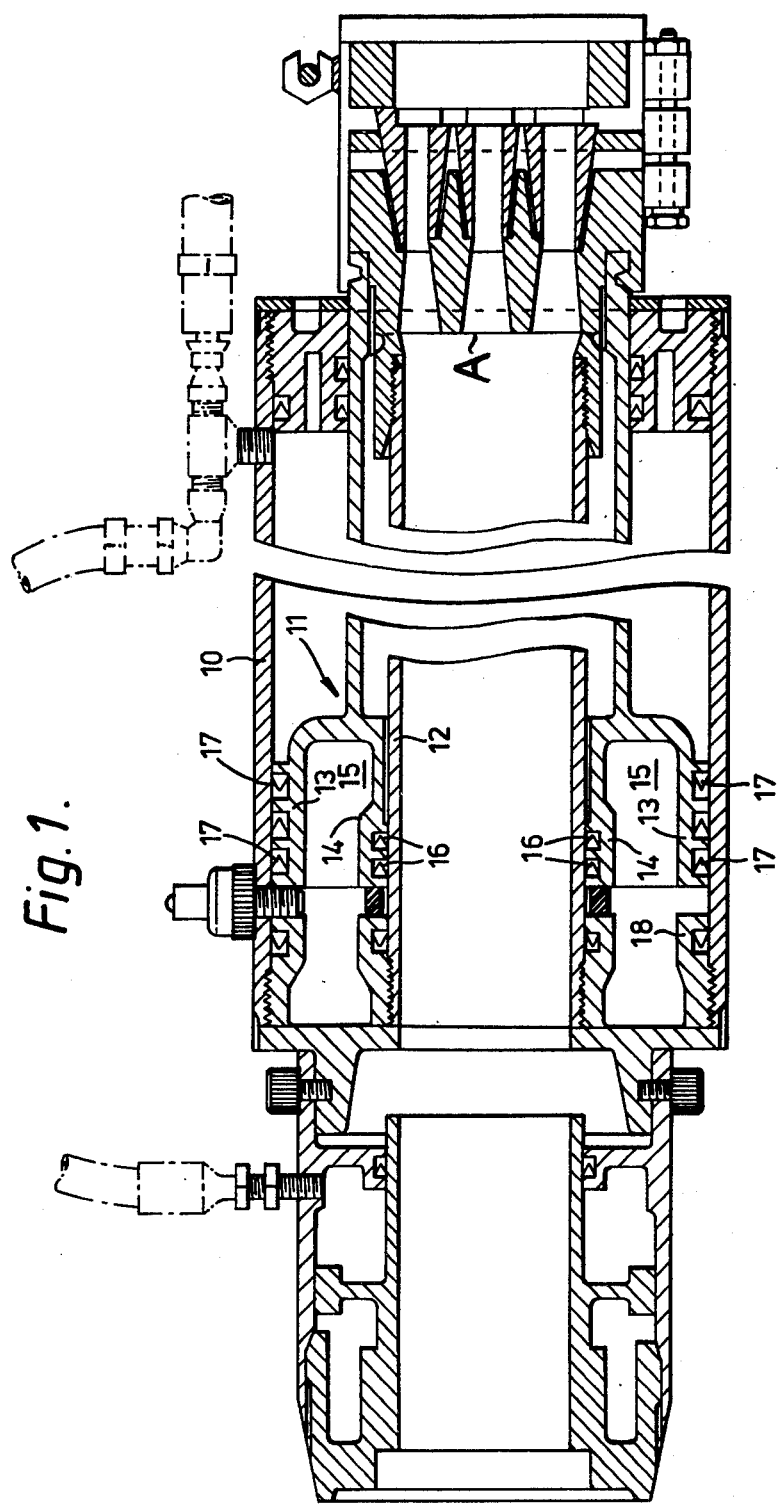
FIG. 1 is a longitudinal cross-section of a hydraulic jack constructed according to the invention, the central part of the jack being omitted for convenience of representation.

Whereas FIG. 1 shows full details of a stressing jack according to the invention it is not proposed to describe all the features of the jack illustrated in the drawings as many of these are unrelated to the present invention and the description will therefore be confined to those features of construction incorporating the invention.

The main parts of the hydraulic jack are an outer cylinder 10 a slidable piston 11 and an inner tube 12 whose separation line occurs at line A. As is readily seen from the drawings the head of the piston is annular in form consisting of an outer wall 13 and an inner wall 14 separated by an annular cavity 15. Grooves 16 are formed on the inner face of the inner wall 14 and grooves 17 on the outer face of the outer wall 13, these grooves accommodating U seals or O rings of conventional construction. The outer cylinder piston and inner tube are all made from steel of the specification known as JIS/SNCM 26 particulars of which are given below.

The design of the piston and cylinder arrived at by conventional calculation methods is such that as pressure in the cylinder between the piston head and the nose cone base 18 increases the tendency of the outer cylinder 10 and inner tube 12 to spread apart will be balanced by the tendency of the walls 13 and 14 of the piston head to spread apart whereby the clearances between the outer wall 13 of the piston and the outer cylinder 10 and between the inner wall of the piston 14 and the inner tube 12 are maintained more or less constant, at any rate to the extent that the U seals will form an effective seal over the full range of working pressures. Also any inclination of the cylinder wall out of parallelism will be matched by a similar inclination of the outer wall of the piston.

The same design principle is applied to the nose cone base 18 which is screwed into the space between the outer cylinder 10 and the inner tube 12. As can be readily seen from FIG. 1 pressure will cause the nose cone base to expand in the manner described for the piston head thus maintaining the seal at the end of the piston as the pressure in the cylinder increases.

Design considerations in relation to seal clearances are set out below for both O rings and U cup seals.

| "O" rings | Maximum clearance | 0.125-.200 mm (large diam.) |
|---|---|---|
|  | less ovality | 0.075 m |

-continued

| | | |
|---|---|---|
| | max. design clearance = | .05 mm |
| | max. deflection α = | 0.10 mm |
| "U" cup seals | Maximum clearance = | .200–.25 mm |
| | ovality = | .075 |
| | max. design clearance = | .125–.175 mm |
| | max. deflection α = | .250 mm–0.35 mm (large diam. units) |

In a conventional hydraulic jack design the design considerations relating to the maximum working stresses in the parts of the jack for both O rings and U cups is calculated on the following basis.

If E = youngs modulus = 200,000 Mpa
 ε = strain
 α = deflection
 d = diameter of cylinder
 fs = stress $$\text{Then } E = \frac{STRESS}{STRAIN} = \frac{fs}{\epsilon}$$

$$fs = E \cdot \epsilon \text{ and } \epsilon = \frac{\alpha}{d}$$

$$= \frac{E\alpha}{d}$$

If "O" ring design
Then maximum fs = Eα/d
If d = 0.100, $$fs = \frac{200,000 \times .100 \text{ mm}}{.100}$$

The limiting working steel stress fs is 200 Mpa
If d = 0.200, fs = 100 Mpa
If "U" cup design
d = 0.100, $$fs = \frac{200,000 \times .2500 \text{ mm}}{.100}$$

The limiting working steel stress fs is 500 Mpa
d = 0.200, $$fs = \frac{200,000 \times .35 \text{ mm}}{.200}$$

The limiting working steel stress fs is 350 Mpa.

In practice the lower "O" ring values are generally adopted.

Hence stress levels must not exceed the above. Also "O" ring and "U" cup designs should not exceed 75% of manufacturers clearance to allow for material life seal deterioration.

Acceptable Design Stresses are therefore:
 "O" rings 200 × 0.75 = 150 Mpa
 "U" cup small = 500 × 0.75 = 375 Mpa
 "U" cup large = 350 × 0.75 = 265 Mpa A typical steel such as JIS/SNCM 5 yield point stress = 900 Mpa The factor of safety at working conditions:
 "O" ring = 900/150 = 6.00
 "U" cup large 900/265 = 3.4

In accordance with the present invention the above steel stress criteria are not applicable thereby enabling very much higher values to be used as the 'O' ring or "U" cup clearance are controlled by the steel strains of the cylinder and piston wall which are such as to maintain the desired clearances throughout the working pressure range.

It is preferred that a jack according to the invention shall be made of steel having no defined YP (yield point) "X" (see FIG. 2) but having sufficient elongation of at least 10 to 12%.

Figure 2:
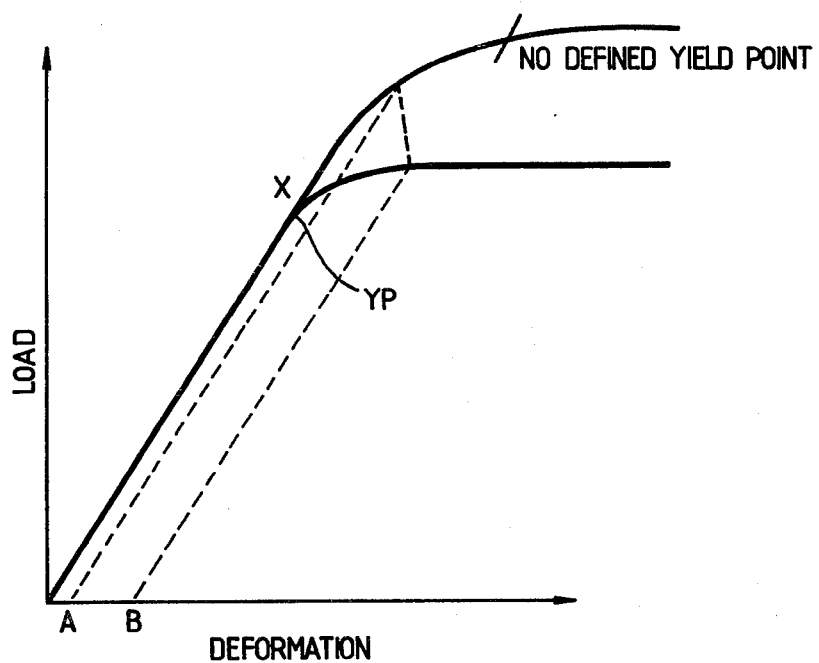
FIG. 2 is a diagram illustrating the deformation of steel under load.

Steels with defined yield point "X" should be so designed to limit maximum performance to less than YP for, if YP is exceeded the cylinder will be permanently deformed OB (FIG. 2) whereas steels with no defined YP recover to a lesser permanent "set"—OA (FIG. 2).

Working stresses in designs according to the invention are calculated as follows:

The stresses are now only governed by the following:

1. Fatigue life
 Cyclic stresses should not exceed:
 fs = 0.45 fs ultimate–0.5 fs ultimate.
 i.e. the stress level of maximum working cyclic stresses.
2. Maximum jack capacity (occasional test loads)
 Factor of safty on ultimate (1.6) = 0.625 fs
3. Maximum rated capacity for a given fatigue life cycle.
 Assume steel SNCM 26 (Austenitic Ni Cr Mo)
 fs = 1300 Mpa
 Max. fs working = 0.5 fs = 650 Mpa
 Max. test load = 0.625 fs 800 Mpa These stress/strain levels are independent of diameter.
 F.S. test load = 1.6
 F.S. working load = 2.0–2.2

Therefore estimated weight reduction on any specific design is approximately 50–60%.

Recommended material for cylinder walls and pistons

High tensile steels having
 1. No defined yield point. (Heat treat accordingly)
 2. Excellent ductility
 3. Excellent fatigue resistance.
 4. Low movement on heat treatment.

A suitable steel is JIS/SNCM 26 having the following composition:

| | |
|---|---|
| C = .13–0.2 | |
| Si = .15–.35 | |
| Mm = .8–1.2 | 1300 Mp Mm 95% greater than |
| Ni = 2.8–3.2 | H.T. to 1400–1450 |
| Cr = 1.4–1.80 | |
| Mo = 0.4–0.6 | |
| Elongation = 10% | |

It has been found that a stressing jack as illustrated in the accompanying drawing will have a weight of between 72 to 75 kilograms for a stress of 145 tons that is approximately ½ kilogram per ton. Other jacks known to the inventor with the corresponding capacity, weigh of the order of 1.0 to 1.5 kilograms weight per ton of capacity. Advantages are achieved with small jacks but these are proportionately less than with larger one. The greater weight of existing jacks is due to a different design approach in that in these jacks the wall thicknesses of the parts have been increased to provide additional strength and rigidity. This however has led to substantial increases in weight which in turn have given rise to substantial handling problems necessitating the use, for example, of cranes.

While the invention has been particularly described in relation to a jack having an annular piston it will be appreciated that the invention can be readily applied to a simpler type of jack in which the piston head is of conventional shape there being a central well in the head of the piston. While steel is the preferred material due to its lesser cost, the design and constructional principals of the invention can be applied equally to jacks made from light alloys.

I claim:

1. A hydraulic jack comprising a cylinder and a piston movable therein, the piston having in its head a cavity, said cavity being bounded by the inner surface of a peripheral wall of the piston, the outer surface of which is in close proximity to the inner surface of the cylinder, sealing means being provided between the piston and cylinder to seal the clearance between the same, the dimensions of and the constructional materials of the piston and cylinder being high tensile steel of the specification known as JIS/SNCM 26 or any equivalent steel, and so selected so that hydraulic pressure applied within the cylinder acts to deform the cylinder wall and the piston wall in such a manner that over the normal range of operating pressures of the jack, the clearance between the piston and the cylinder remain within the capacity of the sealing means to provide a seal between them.

2. A hydraulic jack comprising a cylinder and a piston movable therein, the piston having in its head a cavity, said cavity being bounded by the inner surface of a peripheral wall of the piston, the outer surface of which is in close proximity to the inner surface of the cylinder, sealing means being provided between the piston and cylinder to seal the clearance between the same, the cylinder and the piston wall being so deformable and having such dimensions that the hydraulic pressure applied within the cylinder deforms the cylinder wall and the piston wall in such a manner that, over the normal range of operating pressures of the jack the clearance between the piston and the cylinder remains within the capacity of the sealing means to provide a seal between them.

3. A hydraulic jack as claimed in claim 2 wherein the cylinder comprises an outer wall and an inner wall defining between them an annular cavity in which the piston is movable, the piston having an outer peripheral wall and an inner peripheral wall defining between them an annular cavity, the outer surface of the outer peripheral wall of the piston being in close proximity to the inner surface of the outer wall of the cylinder and the inner surface of the inner peripheral wall of the cylinder being in close proximity to the outer surface of the inner wall of the cylinder.

4. A hydraulic jack as claimed in claim 3 wherein the jack is provided with a nose cone screwed into one end of the cylinder between said outer wall and said inner wall, the nose cone having inner and outer walls defining between them an annular cavity, the outer surface of the outer wall of the nose cone being in close proximity to the inner surface of the outer wall of the cylinder and the inner surface of the inner wall of the nose cone being in close proximity to the outer surface of the inner wall of the cylinder, sealing means being provided between said proximate surfaces the dimension of and the constructional materials of the nose cone and the cylinder being selected so that hydraulic pressure applied within the cylinder acts to deform the cylinder walls and the nose cone walls in such a manner that, over the normal range of operating pressures of the jack the clearance between the nose cone walls and the cylinder walls remains within the capacity of the sealing means to provide an effective seal between them.

5. A hydraulic jack as claimed in claim 2 wherein the said sealing means consist of grooves accommodating O rings or U seals of conventional construction.

6. A hydraulic jack as claimed in any one of the preceding claims wherein the cylinder and piston wall are of high tensile steel having no defined yield point, excellent ductility, excellent fatigue resistance and low movement on heat treatment.

* * * * *